May 24, 1949.  M. GREEN  2,471,271
EDUCATIONAL DEVICE
Filed Nov. 6, 1945
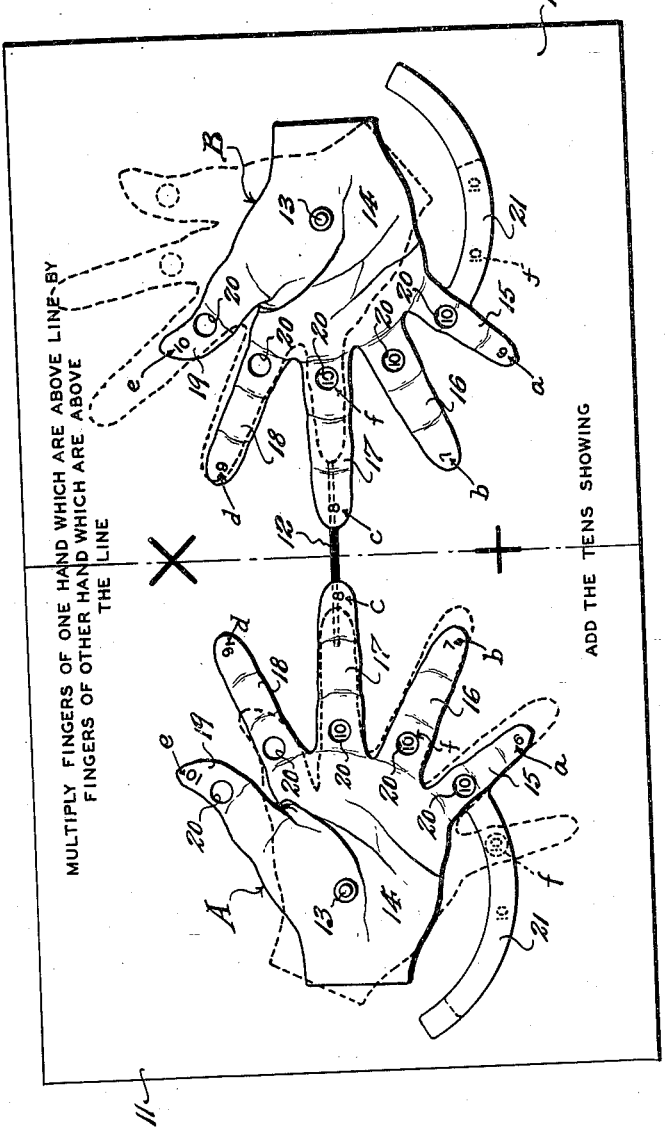
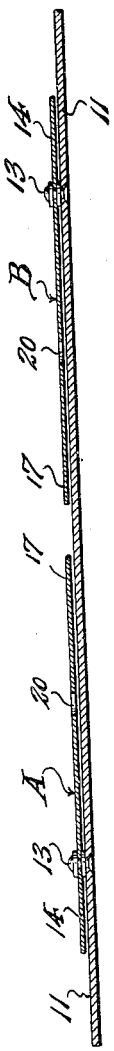
Fig. 1.
Fig. 2.
INVENTOR.
Martin Green,
BY George D. Richards
Attorney Patented May 24, 1949

2,471,271

UNITED STATES PATENT OFFICE 2,471,271

EDUCATIONAL DEVICE

Martin Green, Newark, N. J.

Application November 6, 1945, Serial No. 627,011

2 Claims. (Cl. 35—31)

This invention relates to a novel educational device adapted in use to stimulate children's minds in the performance of simple problems in mental arithmetic.

The invention has for an object to provide a simple manipulatable device which will aid small children in the exercise of mental arithmetical calculations involving both multiplication and addition; the device being adapted to visualize certain steps in such processes, and yet compel a child to mentally obtain the solution of a simple problem in multiplication.

An illustrative embodiment of the invention is shown in the accompanying drawings, in which—

Fig. 1 is a plan view of an educational device made according to this invention; and Fig. 2 is a central longitudinal sectional view thereof.

Similar characters of reference are employed in the above described views, to indicate corresponding parts.

Referring to the drawings, the reference character 11 indicates the base member of the device, the same comprising a flat sheet of stiff cardboard, wood, metal, plastic or other suitable sheet material. Suitably inscribed upon the face of said base member 11 is a central longitudinal reference line 12. Rotatably mounted on the face of said base member 11, by a suitable pivoting means or connection 13, so as to be centered on and in relation to said reference line 12, are spaced apart and opposed rotatable members A and B. Each said member A and B comprises a flat body 14 shaped in the form of a human hand having the fingers and thumb-portions thereof divergently spread and with the little finger portions downwardly and the thumb portions upwardly disposed, so as to provide radial digit-like extensions 15, 16, 17, 18 and 19 respectively corresponding to a little finger, third finger, middle finger, fore finger and thumb of a simulated human hand. The digit-like extensions of each hand-like member A and B respectively bear a number denoting one factor of a simple problem in multiplication. For example, each little finger extension 15 has inscribed on its free-end portion or tip the numeral 6 indicated by the reference character $a$; each third finger extension 16 has inscribed on its free end portion or tip the numeral 7 indicated by the reference character $b$; each middle finger extension 17 has inscribed on its free end portion or tip the numeral 8 indicated by the reference character $c$; each fore finger extension 18 has inscribed on its free end portion or tip the numeral 9 indicated by the reference character $d$; and each thumb extension 19 has inscribed on its free end portion or tip the numeral 10 indicated by the reference character $e$. Additionally each digit-like extension of the hand-like members A and B is provided with a through opening 20 adjacent the inner part or base thereof.

Inscribed on the face of the base 11, to extend from the reference line 12 in an arcuate line downwardly therefrom, so as to underlie digit-like extensions of the hand-like members A and B when said extensions are registered thereover, are rows of numerals 10 indicated by the reference character $f$ which numerals are spaced apart at distances equivalent to the spaced relation of the openings 20 with which said extensions of the hand-like members A and B are provided, whereby rotative movements of the hand-like members A and B and their extensions will expose those of said numerals 10 through said openings 20 of extensions positioned at and below the reference line 12. Extending from the digit or little finger 15 of each hand-like member A and B is an arcuate cover strip 21, adapted to move with said members when they are rotated; said cover strip 21 serves to cover and conceal any of said numerals 10 which lie beyond covering digit-like extensions. Said numerals 10 denote factors of simple problems of addition or supplementary multiplication, whereby to supplement in such problems of preliminary multiplication in such manner that the sums of the problem of preliminary multiplication and of said supplementary addition or multiplication will provide the solution of the main problem of multiplication desired to be obtained.

In the use of the device, the main problems of multiplication to be solved are provided by the requirement of multiplying the numerals respectively borne by digit-like extensions of the opposed hand-like members A and B which are brought into alignment or registration with the base reference line 12. When the hand-like members A and B are turned to register selected digit-like extensions thereof with the base reference line 12, the child notes the numerals respectively borne by such aligned or registered digits as those to be multiplied one by the other. The child is then told to count the digit-like extensions A and of the respective hand-like members A and then which lie above the reference line 12, and then upon multiply the number of such extensions of the one hand-like member by those of the other hand-like member, remembering the product. The child is then told to observe and count numerals 10 which are exposed through the openings 20 of the digit-like extensions of hand-members A and B which lie at and below the reference line 12, and to either add the same together or multiply 10 by the number thereof. Having done this, the child is told to add the sum of the exposed numerals 10 to the product of the preliminary multiplication previously obtained, and that result will be the solution of the main problem of multiplication posed by the numerals borne by the opposed digit-like extensions registered at the reference line 12.

Illustrative of the above described method of using the device, reference may be had to the position of the hand-like members A and B as shown by full lines in Fig. 1. It will be noted that the digit-like extensions 17 of each said member are aligned or registered with the reference line 12, and that each digit bears the numeral 8, so that the main problem to be solved is that of multiplying 8 by 8. In such position of the hand-like members A and B, it will be observed that two digit-like extensions of each hand lie above the reference line 12, so that the preliminary multiplication is that of mentally multiplying 2 by 2, thus obtaining the product 4. In the described position of the hand-like members, it will be noted that the openings 20 of the extensions of each hand-like member which are located at and below the reference line, will collectively expose six numerals 10 of the base member 11, the sum of which is 60. Adding 60 to the product 4 of the preliminary multiplication, the result will be 64 and thus provides the solution of the main problem of multiplying 8 by 8.

Assuming the positions of the hand-like members A and B to be those indicated by broken lines in Fig. 1, with the fore finger extension 18 of the hand-like member A, which bears numeral 9, aligned with the reference line 12, and little finger or digit 15 of the hand-like member B, which bears the numeral 6, aligned with the reference line 12, it follows that the main problem of multiplication thus posed will be that of multiplying 9 by 6. It will be noted that with respect to hand-like member A but one extension lies above the reference line 12, while with respect to hand-like member B there are four extensions lying above the reference line 12. The preliminary multiplication is therefore 1 by 4, and the product is 4. The four extensions of the hand-like member A which lie at and below the reference line 12 will each expose, through their openings 20 a numeral 10, while the one extension of the hand-like member B at the reference line 12 will expose through its opening 20 a numeral 10, all other numerals 10 being concealed by the overlying cover strips 21, so that five numerals 10 are exposed, the sum of which is 50. Adding this sum to the product 4 of the preliminary multiplication, the result is 54 and the solution of the posed problem of multiplying 9 by 6.

It will be understood from the above that use of the device will stimulate both the child's powers of observation by the requirement of noting the position of the hand-like members and the disposition and number of digit-like extensions hereof lying above and below the reference line f the base, as well as the child's mental operations involved in making the several calculating eps leading to the solution of a given posed problem; each said step per se being relatively simple.

Having now described my invention, I claim:

An educational device of the kind and for the purposes described comprising a base member having a base reference line inscribed upon its face, a pair of rotatable hand-like members mounted on said base member in spaced apart opposed relation, said hand-like members having pivotal connections with said base member coincident with said base reference line, each hand-like member having spread apart digit-like extensions radial to the pivotal point thereof, corresponding digit-like extensions of said hand-like members having like numerals inscribed thereon to provide factors of multiplication problems to be solved, each extension having a through opening formed therein, said base member having inscribed thereon a series of spaced number tens extending from and below the base reference line and aligning with said openings, whereby to be exposed therethrough, and each hand-like member having a cover strip extending therefrom and movable therewith, whereby to conceal all said tens on the base member not in register with openings in the extensions of said hand-like members.

2. An educational device of the kind and for the purposes described comprising a base member having a base reference line inscribed upon its face, a pair of rotatable hand-like members mounted on said base member in spaced apart opposed relation, said hand-like members having pivotal connections with said base member coincident with said base reference line, each hand-like member having spread apart digit-like extensions radial to the pivotal point thereof, said extensions comprising a little finger, a third finger, a middle finger, a fore finger and a thumb, with the latter uppermost, corresponding extensions of each hand-like member having like numerals inscribed thereon to provide factors of multiplication problems to be solved, said numerals comprising the number six on the little finger extensions, the number seven on the third finger extensions, the number eight on the middle finger extensions, the number nine on the fore finger extensions, and the number ten on the thumb extensions, each extension having a through opening formed therein, said base member having inscribed thereon a series of spaced number tens extending from and below the base reference line and aligning with said openings, whereby to be exposed therethrough, and each hand-like member having a cover strip extending therefrom and movable therewith, whereby to conceal all said number tens of the base member not in register with openings in the extensions of said hand-like members.

MARTIN GREEN.

REFERENCES CITED

The following references are of record in the file of this patent:

UNITED STATES PATENTS

| Number | Name | Date |
|---|---|---|
| 1,457,223 | Gallup | May 29, 1923 |
| 1,548,601 | Hoeft | Aug. 4, 1925 |
| 1,581,390 | Cook | Apr. 20, 1926 |

FOREIGN PATENTS

| Number | Country | Date |
|---|---|---|
| 331,979 | Germany | 1921 |